(12) United States Patent
Joglekar et al.

(10) Patent No.: US 10,878,399 B1
(45) Date of Patent: Dec. 29, 2020

(54) SYSTEM AND METHOD FOR IMPLEMENTING PAYMENT WITH A MOBILE PAYMENT DEVICE

(71) Applicant: JPMorgan Chase Bank, N.A., New York, NY (US)

(72) Inventors: Ajinkya P. Joglekar, Philadelphia, PA (US); Manning R. Field, Media, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 603 days.

(21) Appl. No.: 14/790,222

(22) Filed: Jul. 2, 2015

(51) Int. Cl.
| | |
|---|---|
| *G06Q 20/32* | (2012.01) |
| *H04W 4/021* | (2018.01) |
| *H04W 64/00* | (2009.01) |
| *G06Q 20/14* | (2012.01) |
| *G06Q 50/00* | (2012.01) |
| *H04W 88/02* | (2009.01) |
| *G06Q 30/02* | (2012.01) |

(52) U.S. Cl.
CPC ........... *G06Q 20/322* (2013.01); *G06Q 20/14* (2013.01); *G06Q 30/0224* (2013.01); *G06Q 50/01* (2013.01); *H04W 4/021* (2013.01); *H04W 64/003* (2013.01); *H04W 88/02* (2013.01)

(58) Field of Classification Search
CPC .. G06Q 20/322; G06Q 20/14; G06Q 30/0224; G06Q 50/01; G06Q 20/32; G06Q 30/02; H04W 4/021; H04W 64/003; H04W 88/02; H04W 64/00
See application file for complete search history.

(56) References Cited

U.S. PATENT DOCUMENTS

| | | |
|---|---|---|
| 6,438,594 B1 | 8/2002 | Bowman-Amuah |
| 6,442,748 B1 | 8/2002 | Bowman-Amuah |
| 6,477,580 B1 | 11/2002 | Bowman-Amuah |
| 6,494,367 B1 | 12/2002 | Zacharias |
| 6,554,185 B1 | 4/2003 | Montross et al. |
| 6,571,282 B1 | 5/2003 | Bowman-Amuah |
| 6,578,068 B1 | 6/2003 | Bowman-Amuah |

(Continued)

OTHER PUBLICATIONS

SportOneSource, "New retail technologies," Dec. 2012, pp. 1-5. (Year: 2012).*

(Continued)

*Primary Examiner* — Kenneth Bartley
(74) *Attorney, Agent, or Firm* — Hunton Andrews Kurth LLP

(57) ABSTRACT

The invention relates to a mobile device that makes payment for items without having to physically interact with a cashier terminal, the mobile device comprising: a memory that stores data associated with an account and a user; a microprocessor, coupled to the memory, programmed to perform the following: detect the mobile device entering a merchant location; activate a precheck feature on the mobile device upon the mobile device entering a merchant location; identify one or more items for checkout based on a sensor corresponding to each item; calculate a total amount for the one or more items; automatically initiate a charge for the total amount when the mobile device departs the merchant location; and deduct the total amount of the charge from a funding source.

18 Claims, 11 Drawing Sheets

(56) References Cited

U.S. PATENT DOCUMENTS

| | | | |
|---|---|---|---|
| 6,587,835 B1* | 7/2003 | Treyz | G06Q 20/12 705/14.64 |
| 6,640,238 B1 | 10/2003 | Bowman-Amuah | |
| 6,640,249 B1 | 10/2003 | Bowman-Amuah | |
| 6,776,332 B2 | 8/2004 | Allen et al. | |
| 6,805,287 B2 | 10/2004 | Bishop et al. | |
| 6,805,289 B2 | 10/2004 | Noriega et al. | |
| 6,938,156 B2 | 8/2005 | Wheeler et al. | |
| 6,950,940 B2 | 9/2005 | Wheeler et al. | |
| 6,965,868 B1 | 11/2005 | Bednarek | |
| 6,980,970 B2 | 12/2005 | Krueger et al. | |
| 6,991,157 B2 | 1/2006 | Bishop et al. | |
| 7,070,112 B2 | 7/2006 | Beenau et al. | |
| 7,080,036 B1 | 7/2006 | Drummond et al. | |
| 7,096,003 B2 | 8/2006 | Joao et al. | |
| 7,103,576 B2 | 9/2006 | Mann, III et al. | |
| 7,104,443 B1 | 9/2006 | Paul et al. | |
| 7,119,659 B2 | 10/2006 | Bonalle et al. | |
| 7,188,089 B2 | 3/2007 | Goldthwaite et al. | |
| 7,225,249 B1 | 5/2007 | Barry et al. | |
| 7,249,092 B2 | 7/2007 | Dunn et al. | |
| 7,783,578 B2 | 8/2010 | Mann, III et al. | |
| 8,204,809 B1* | 6/2012 | Wise | G06Q 40/06 705/35 |
| 8,577,734 B2* | 11/2013 | Treyz | G06Q 30/0641 705/26.1 |
| 8,612,294 B1* | 12/2013 | Treyz | G07F 7/02 705/14.62 |
| 9,373,112 B1* | 6/2016 | Henderson | G06Q 20/40 |
| 2002/0059139 A1 | 5/2002 | Evans | |
| 2002/0082962 A1 | 6/2002 | Farrus et al. | |
| 2002/0091635 A1 | 7/2002 | Dilip et al. | |
| 2002/0152123 A1 | 10/2002 | Giordano et al. | |
| 2002/0152179 A1 | 10/2002 | Racov | |
| 2003/0040959 A1 | 2/2003 | Fei et al. | |
| 2003/0149629 A1 | 8/2003 | Claridge et al. | |
| 2003/0208439 A1 | 11/2003 | Rast | |
| 2003/0217005 A1 | 11/2003 | Drummond et al. | |
| 2003/0218066 A1 | 11/2003 | Fernandes et al. | |
| 2003/0233278 A1 | 12/2003 | Marshall | |
| 2004/0029569 A1 | 2/2004 | Khan et al. | |
| 2004/0078332 A1 | 4/2004 | Ferguson et al. | |
| 2004/0094624 A1 | 5/2004 | Fernandes et al. | |
| 2004/0118930 A1 | 6/2004 | Berardi et al. | |
| 2004/0159700 A1 | 8/2004 | Khan et al. | |
| 2004/0230536 A1 | 11/2004 | Fung et al. | |
| 2004/0260607 A1 | 12/2004 | Robbins et al. | |
| 2004/0260646 A1 | 12/2004 | Berardi et al. | |
| 2005/0004866 A1 | 1/2005 | Bonalle et al. | |
| 2005/0033689 A1 | 2/2005 | Bonalle et al. | |
| 2005/0035847 A1 | 2/2005 | Bonalle et al. | |
| 2005/0137977 A1* | 6/2005 | Wankmueller | G06Q 20/102 705/40 |
| 2006/0173791 A1 | 8/2006 | Mann, III et al. | |
| 2006/0214796 A1* | 9/2006 | Ishikawa | G08B 13/2462 340/572.1 |
| 2008/0149729 A1* | 6/2008 | Philips | B65D 27/02 235/487 |
| 2011/0024181 A1* | 2/2011 | Phillips | B65D 27/02 174/350 |
| 2012/0193434 A1* | 8/2012 | Grigg | G06Q 20/227 235/492 |
| 2012/0196586 A1* | 8/2012 | Grigg | H04B 5/0031 455/418 |
| 2012/0197691 A1* | 8/2012 | Grigg | G06Q 20/20 705/14.1 |
| 2012/0197787 A1* | 8/2012 | Grigg | G06Q 20/227 705/40 |
| 2013/0006742 A1* | 1/2013 | Richard | G06Q 30/0236 705/14.25 |
| 2013/0013490 A1* | 1/2013 | Keller | G06Q 20/3226 705/39 |
| 2013/0191279 A1* | 7/2013 | Calman | G06Q 20/3226 705/41 |
| 2013/0262198 A1* | 10/2013 | Chung | G06Q 30/0226 705/14.1 |
| 2014/0159869 A1* | 6/2014 | Zumsteg | G06K 7/0004 340/10.1 |
| 2014/0207680 A1* | 7/2014 | Rephlo | G06Q 20/322 705/44 |
| 2017/0200152 A1* | 7/2017 | Winkler | G07G 1/0045 |

OTHER PUBLICATIONS

Urien et al. "LLCPS and SISO: A TLS-Based Framework with RFID for NFC P2P Retail Transaction Processing," 2013, 2013 IEEE International Conference on RFID, pp. 152-159 (Year: 2013).*

* cited by examiner

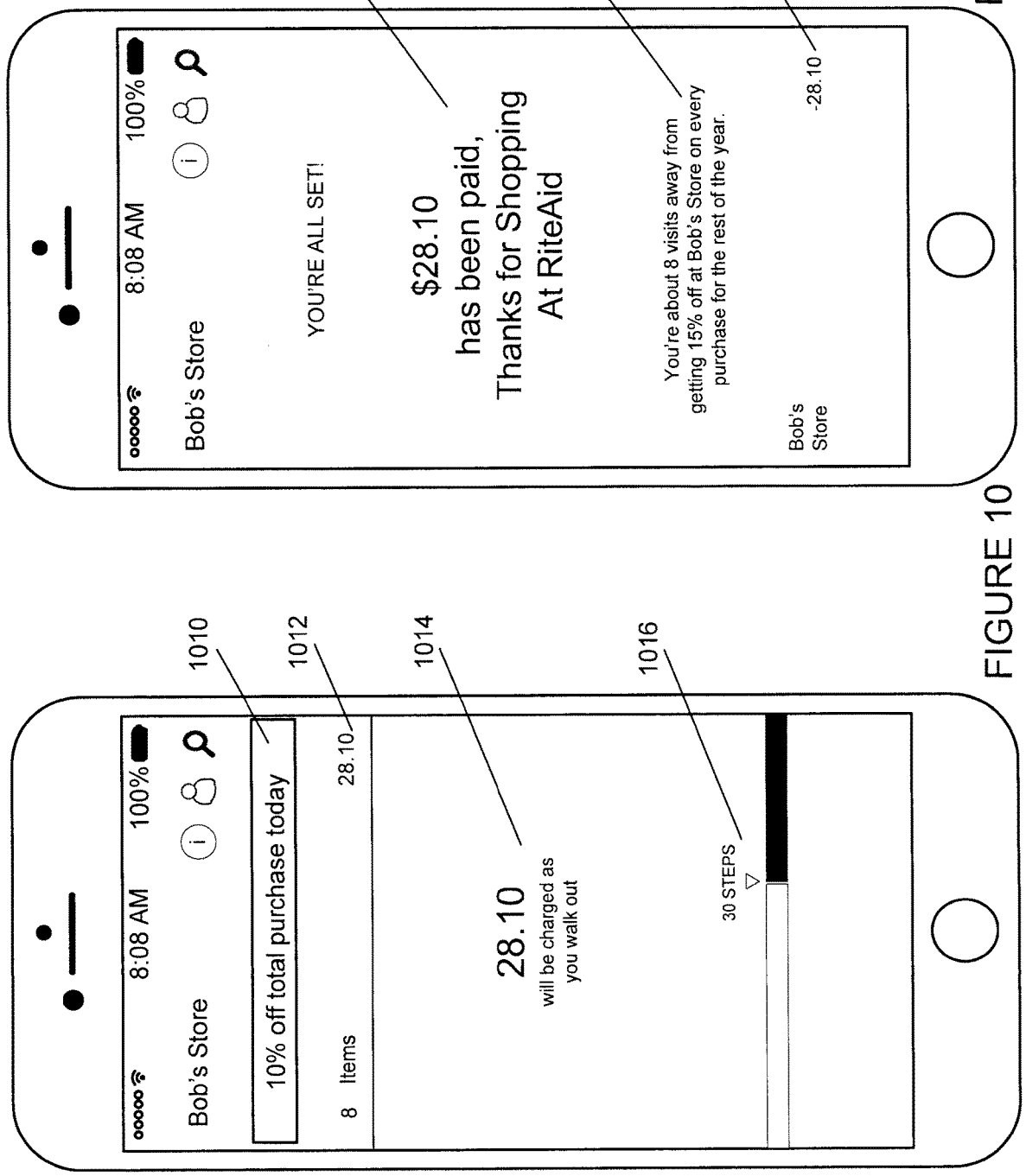

SYSTEM AND METHOD FOR IMPLEMENTING PAYMENT WITH A MOBILE PAYMENT DEVICE

RELATED APPLICATIONS

The application is related to co-pending applications, U.S. application Ser. No. 14/790,417, titled "System and Method for Increasing Credit Worthiness of Account Holders"), and U.S. application Ser. No. 14/790,141, titled "System and Method for Assisting Customers Achieve Purchase Goals"), both filed concurrently on Jul. 2, 2015, the contents of which are incorporated herein in their entirety.

FIELD OF THE INVENTION

The invention relates generally to a system and method for implementing a mobile payment device, and more particularly to a system and method for making payments with a mobile device at a merchant store without having to physically interact with a cashier or other payment terminal.

BACKGROUND

Mobile payments generally refer to payment services via a mobile device. Instead of paying with cash or credit cards, a consumer can use a mobile phone to pay for products and services. Mobile payments may also be known as mobile money, mobile money transfer, and mobile wallet. Mobile payments are gaining greater popularity with customers and acceptance from merchants. However, consumers are still resistant to use mobile payments due to fraud concerns, inconvenience and limits in technology. Moreover, because consumers are still required to interact with a cashier, inconveniences and timing inefficiencies are not avoided. Accordingly, consumers are not able to fully realize the benefits of mobile payments.

These and other drawbacks currently exist.

SUMMARY

According to one embodiment, the invention relates to a computer-implemented system and method for making a payment for items without having to physically interact with a cashier terminal. The system may include: a mobile device that pays for items without having to physically interact with a cashier terminal, the mobile device comprising: a memory that stores data associated with an account and a user; a microprocessor, coupled to the memory, programmed to perform the following: detect the mobile device entering a merchant location; activate a precheck feature on the mobile device upon the mobile device entering a merchant location; identify one or more items for checkout based on a sensor corresponding to each item; calculate a total amount for the one or more items; automatically initiate a charge for the total amount when the mobile device departs the merchant location; and deduct the total amount of the charge from a funding source.

The invention also relates to a method that may be conducted on a specially programmed computer system comprising one or more computer processors, mobile devices, electronic storage devices, and networks.

The invention also relates to a computer readable medium containing program instructions for executing a method for paying for items without having to physically interact with a cashier terminal, wherein execution of the program instructions by one or more processors of a computer system causes the one or more processors to carry out the steps of: detecting the mobile device entering a merchant location; activating a precheck feature on the mobile device upon the mobile device entering a merchant location; identifying one or more items for checkout based on a sensor corresponding to each item; calculating a total amount for the one or more items; detecting the mobile device departing the merchant location; automatically initiating a charge for the total amount responsive to the mobile device departing the merchant location; and deducting the total amount of the charge from a funding source.

The computer implemented system, method and medium described herein can provide the advantage of facilitating mobile payments for in-store purchases. Another advantage that can be achieved is customer convenience. The system provides a mobile device implementation that enables a customer to conveniently shop and make purchases, without having to interact with a store cashier or other payment terminal. That type of experience may enhance loyalty to the financial institution much more than a conventional credit or debit card. Also, customers can receive personalized recommendations, suggestions and benefits. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 10 is an exemplary screen shot illustrating a precheck feature, according to an embodiment of the present invention.

FIG. 11 is an exemplary screen shot illustrating a precheck feature, according to an embodiment of the present invention.

DETAILED DESCRIPTION

Figure 1:
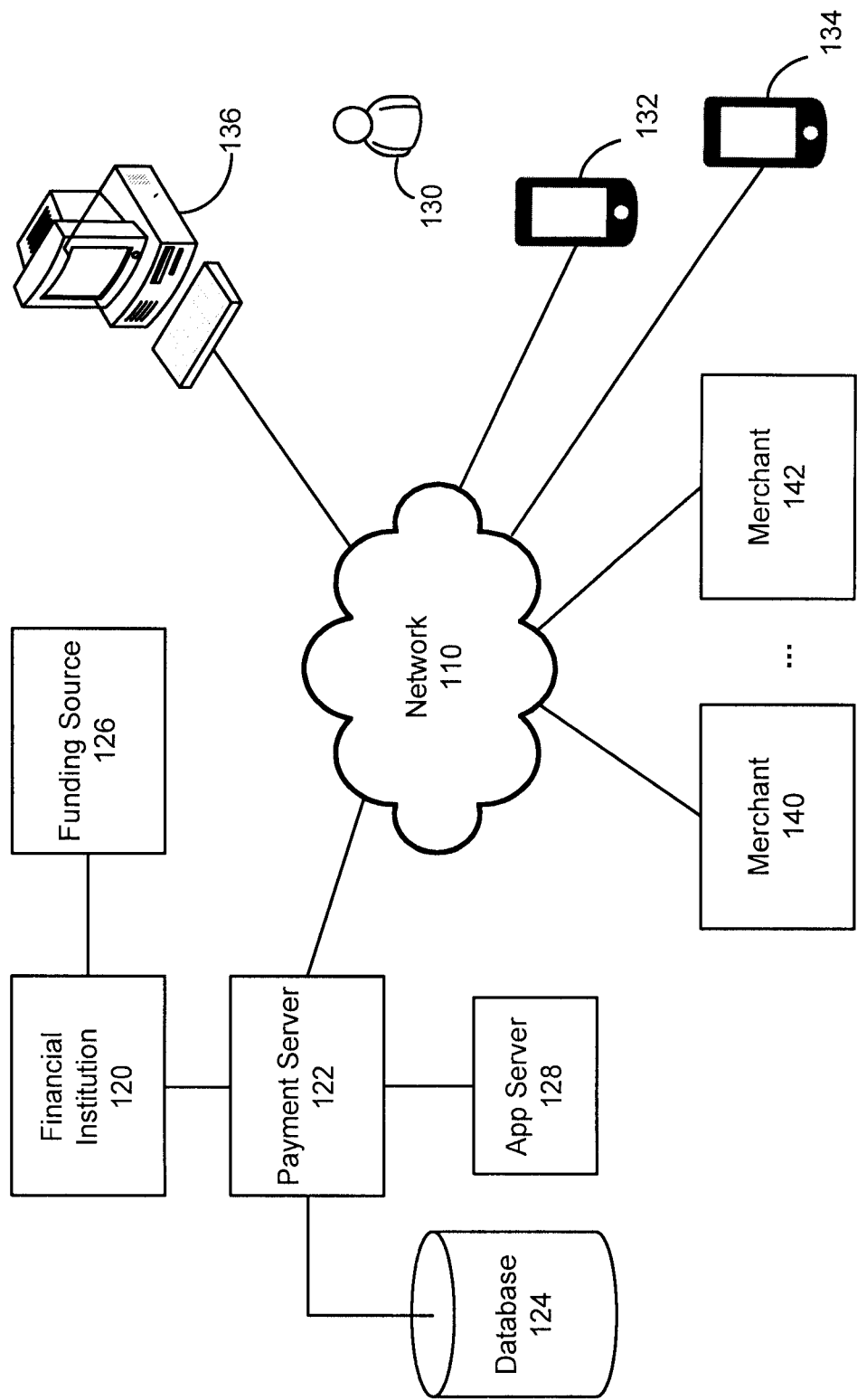
FIG. 1 is a diagram of a system for implementing a precheck feature for an account holder, according to an exemplary embodiment of the invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to enabling a customer to use a mobile phone as a payment instrument without having to interact with a cashier or other payment terminal. In other words, the customer does not have to pull the mobile phone out of his or her pocket to make a payment. An embodiment of the present invention may use wireless technology to identify and track tags attached to items for purchase, this may include RFID technology, electromagnetic technology and wireless technology. According to an embodiment of the present invention, a mobile app may provide customized deals, status and/or other information to the customer.

An embodiment of the present invention may verify a customer so that the customer may be approved or authorized to purchase goods and services from merchants without having to swipe or show a mobile device with payment capability or other payment instrument, such as a credit card. A customer may activate a pre-check feature on a mobile device or other payment instrument. For example, a customer may use a credit card to pay for a coffee at a local coffee shop. The barista may ask if the customer would like to activate the precheck feature during the transaction. The customer may also activate the feature online, via phone, at credit card activation and/or other action. In addition, the customer may activate the feature at various locations, including at a merchant, a branch location, ATM, kiosk and/or other location. By activating the feature, the customer no longer needs to show or otherwise interact with the payment instrument in order to pay. The customer may also view spending by category, location, merchant and/or other metric or filter.

As the customer progresses in payments and purchases, an embodiment of the present invention may provide customized incentives, rewards, benefits, services, etc. The customer may receive a notification that a new benefit is available. For example, because the customer spends a threshold amount in a geographic location, the customer may be considered a preferred customer at local shops and restaurants. Other customers may receive invitations to special events, access to special deals and offers and/or other benefits and privileges. For example, an embodiment of the present invention may enable customers to pre-order items, skip lines and receive discounts at local shops and businesses.

An embodiment of the present invention may further enable customers to walk in and out of stores without having to wait in line or otherwise interact with a sales representative. For example, as a customer enters a grocery store, the customer's mobile phone may vibrate (or otherwise alert the customer) to indicate to the customer that the precheck feature has been activated. The customer may then add items to a shopping bag as the customer walks around the store. Each product may have a sensor, such as a RFID tag or other sensing or wireless technology. As the customer shops, the customer may check a total amount and further verify that the customer is on budget. The customer may also view coupons, deals and/or other incentives. As the customer exits, all of the items are automatically scanned and then charged to the customer's payment instrument. In addition, the mobile phone may vibrate again to confirm that the items were charged via the precheck feature. Other alerts may be used.

According to an embodiment of the present invention, an authentication feature may be implemented. Customer authentication may occur at checkout, activation, during the shopping process, etc. Authentication may be provided through various mechanisms, including customer behavior or other activity. Also, authentication may be applied for purchases over a predetermined threshold (e.g., high-end, expensive purchases, etc.), unusual purchases, high number of the same product, etc. Authentications may also include customer actions, behavior, fingerprint recognition, PIN, facial recognition, swipe pattern, etc. For example, as the customer shops and is ready to exit the store, an embodiment of the present invention may apply an authentication feature. The authentication feature may include customer actions and behavior, such as where the customer exits the store, whether the customer's shopping list is consistent with the purchases in the customer's shopping bag, etc. If the system detects an expensive product (that is not on the customer's shopping list), an authentication for that product may be requested (e.g., voice command, unique phrase, finger print, etc.). Other forms of authentication and fraud prevention mechanisms may be applied.

An embodiment of the present invention provides purchase confirmations and details on a customer's mobile device. Customers may view various forms of information. For example, spending may be organized by category, location and/or other metric. Recommendations may be provided to customers based on local spending behavior and peer trends. Also, purchase confirmations and details may be provided on the customer's mobile device. An embodiment of the present invention may also provide various benefits, including local VIP customer pass, loyal customer perks and discounts, etc.

An embodiment of the present invention provides proximity based geo-targeting and checkout. For example, beacons may inform merchants that an enrolled customer is in the store. Other sensors or wireless technology may be used. Also, RFID tags or other similar technology may be used to automatically scan and total products for purchase.

FIG. 1 is a diagram of a system for implementing a precheck feature for an account holder, according to an exemplary embodiment of the invention. As shown in FIG. 1, the system may include one or more computer servers and networks. The system may be provided by a business or entity that has access to relevant information to enhance the card holder's experience. According to one embodiment, the system is operated and maintained by a financial institution such as retail bank using, in part, data on its retail bank customers, e.g., card holders of credit and debit cards issued by the retail bank.

As shown in FIG. 1, a customer or user 130 may access a network 110 via various devices, including mobile device 132, 134, computer 136 as well as other communication and processing devices, including wearables, etc. The customer may access a mobile app or other program that runs on a mobile device, computer or other processing device that enables a customer to access a merchant program. According to an embodiment of the present invention, the customer may receive a digital card that is linked to the mobile device of the customer, as described in co-pending application U.S. patent application Ser. No. 14/726,982.

Also shown in FIG. 1 is an account holder 130 of the financial institution who may communicate electronically with a financial institution 120 using a mobile device 132, 134 and a personal computing device 136. The mobile device 132, 134 may be a smart phone, such as an Apple iPhone, Samsung Galaxy, or Amazon Fire Phone, that includes a touch screen or other interactive display. The mobile device 132, 134 may also include other hardware and software enabling them to communicate using other communication channels, such as a near field communication (NFC) signals or a Bluetooth signals. The mobile device 132, 134 also typically includes hardware and software to enable communication with a cellular network and WiFi network. The personal computing device 136 may comprise a laptop computer, tablet computer, or desktop computer, for example. The account holder 130 may use the personal computing device 136 to execute various online transactions with the financial institution 120 at home or elsewhere.

An embodiment of the present invention may be provided by various entities, such as a financial institution, service provider, merchant, etc. For example, a merchant app may be offered by a merchant, represented by Merchant 140, 142, or a third party service provider. The customer may also access a payment system provided by a financial institution 120 such as a retail bank, according to one embodiment of the invention. The payment system may be embodied primarily or entirely in a payment server 122 (which may include one or more databases represented by 124) owned and/or operated by the financial institution 120 that interfaces with a number of other servers and entities via one or more networks.

Payment server 122 enables user or account holder 130 to make payments by interfacing with other servers owned and/or operated by the financial institution 120 and/or other entities. The app server 128 may interface with other servers owned and/or operated by the financial institution. For example, payment server 122 may interface with a credit card server and associated database that stores and processes credit card transactions for credit card holders of the financial institution 120. Payment server 122 may also interface with a rewards program server and associated database that stores and processes rewards information for account holders at the financial institution 120. The foregoing description is merely one example of a configuration for such functions and is not intended to be limiting.

Various embodiments of the invention may also utilize an established payment network such as the VISA network, MasterCard network, NYCE network, or other similar network to transmit information between various entities using the system. For example, payment server 122 may use the VISA network for authorization and settlement of transactions. However, use of such established credit and debit networks is not required according to various embodiments of the invention. Payment Server 122 may be configured to use other networks for executing payment transactions and transmitting information to the cardholders, merchants, and financial institutions. Payments can be made by rendering such other payment network's digital tender on the mobile device 132, 134.

Referring again to FIG. 1, the network 110 enables communications between various computing devices and storage devices in the system. The network 110 may comprise one or more of the Internet, a wide area network (WAN), a local area network (LAN), and/or an intranet, according to various embodiments of the invention. The network 110 may also comprise, include, or interface to any one or more other communication channels or devices, such as a digital T1, T3, E1 or E3 line, a digital subscriber line (DSL) connection, an Ethernet connection, an integrated services digital network (ISDN) line, a WiFi connection, Bluetooth connection, a Wireless Application Protocol (WAP) link, a Global System for Mobile Communication (GSM) link, a Global Positioning System (GPS) link, a cellular digital packet data (CDPD) link, or a satellite communication channel, for example.

As shown in FIG. 1, a user 130 may use a mobile device 132, 134 to make purchases offered or provided by a merchant or other service or product provider. For example, the mobile device 132, 134 may include a mobile app that enables the user to make purchases. The user's ability to make purchases may be funded from a funding source 126. For example, a funding source may be funded by a financial institution in the form of points, credit and/or other metric or currency. Funding source 126 may be specific to one customer. Also, a funding source may be for a family of customers or a group of customer where points and benefits may be shared, allocated and/or distributed to the members.

Having described an example of the hardware, software, and data that can be used to run the system, an example of the method and customer experience will now be described. The method will be described primarily as an example in which a customer downloads a software application (sometimes referred to as an "app") and uses it for accumulating points and/or making purchases. However, those skilled in the art will appreciate that the principles of the invention can be applied to related circumstances, such as where the entity providing the app is a business other than a merchant, or where the merchant app functionality is provided through a browser on the customer's mobile device rather than through a software application (app) downloaded to the customer's mobile device, and with purchases from various providers.

Figure 2:
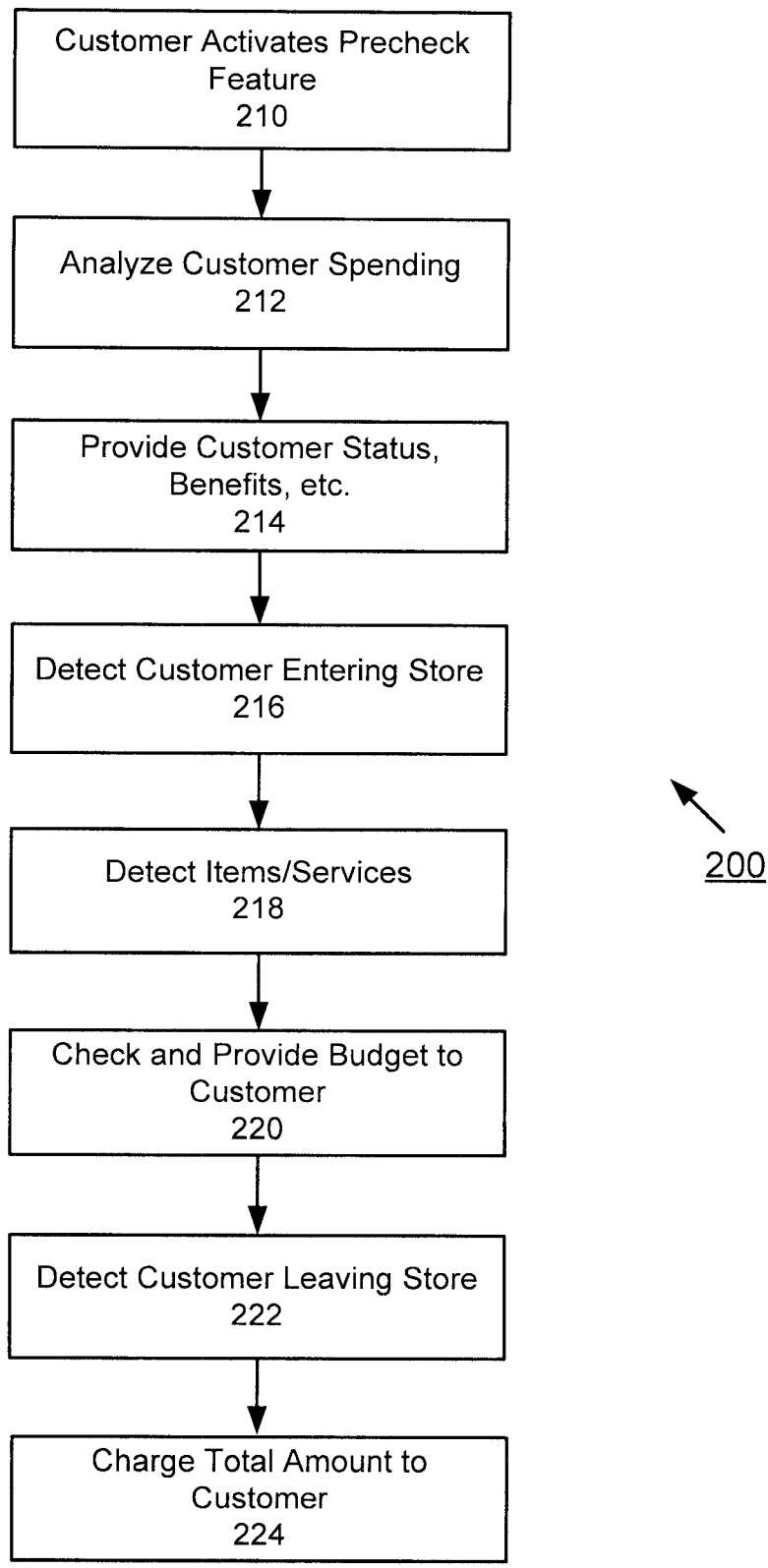
FIG. 2 is an exemplary diagram of a method for implementing a precheck feature for an account holder, according to an embodiment of the present invention.

FIG. 2 is an exemplary diagram of a method for implementing a precheck feature for an account holder, according to an embodiment of the present invention. At step 210, a customer may activate a precheck feature. At step 212, customer spending may be analyzed. At step 214, an embodiment of the present invention may provide customer status. At step 216, with the precheck feature activated, a customer may enter a merchant location. At step 218, the customer may shop at the merchant location. At step 220, the customer may check a budget, item total, etc. At step 222, the customer may leave the store. At step 224, the customer may be charged. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a customer may activate a precheck feature on a mobile device. An embodiment of the present invention may automatically enroll a customer in a precheck feature that enables the customer to purchase products and services without having to proactively checkout. For example, if a customer is deemed to be in good standing, the customer may automatically receive this feature. Also, the customer may request or otherwise activate this feature. In addition, a store clerk may inform the customer that this option is available and activate the feature for the customer during a purchase transaction. Other variations on activation may be realized.

At step 212, customer spending may be analyzed. An embodiment of the present invention may analyze the customer's behavior, which may also include spending, merchant preferences, redemption activity, payment behavior as well as other customer activity, including social media activity, affiliations, affinities, etc. An embodiment of the present invention may also analyze behavior from other merchants, services, financial institutions, banks, etc.

At step 214, an embodiment of the present invention may provide customer status, benefits and/or other incentives. Based on the analyzed customer behavior, an embodiment of the present invention may identify tailored and customized rewards, incentives, benefits, etc. The customer may be notified of time-sensitive perks while the customer is at or near a providing merchant location.

At step 216, with the precheck feature activated, a customer may enter a merchant location. As the customer enters a merchant location, the customer may be alerted that the precheck feature is automatically activated. Also, the customer may initiate activation of the precheck feature. For example, the precheck feature may be automatically activated at some stores and not others. The precheck feature may be activated at certain time periods, e.g., after work, weeknights but not weekends. Accordingly, precheck activation may be customized for each user.

At step 218, the customer may shop at the merchant location. As the customer shops, each item may be recognized as it is placed in a shopping cart or bag. An embodiment of the present invention may use sensor technology, e.g., RFID tags, wireless sensors, etc. In addition, the customer may identify or scan items for subsequent delivery. In this example, a customer may identify items and then depart the store. The identified items may be charged to the customer and then later delivered to the customer's home or other location. Also, the customer may engage in services that can be added to the customer's bill. For example, the customer may also add a gratuity, which may be preset or automatically calculated and added.

At step 220, the customer may check a budget, item total, etc. As the customer is shopping, the customer may verify that the purchases are within budget. The customer may also view line item information. For example, if a customer is over budget, a warning (e.g., text message, etc.) may be activated. An embodiment of the present invention may apply stored or scanned coupons as well as credit, gift cards, store credit, etc. In addition, the customer may apply other forms of credit, currency, loyalty points, etc. to an item as well as a total or partial amount of the total.

At step 222, the customer may leave the store. When the precheck feature is activated, the customer may skip the checkout. As the customer departs the store, a mobile phone may vibrate, chime, etc. to indicate to the user that the purchases were recognized.

At step 224, the customer may be charged for the total purchase. The charge may be applied to a particular loyalty card that is tied to the merchant. The charge may be applied to a credit card, debit card, account, etc. Other types of payment instruments and funds may be applied. For example, the charge may be applied to multiple payment instruments, e.g., loyalty card, credit card, debit card, account, etc., based on various schedules or breakdowns, e.g., 75% charged to a loyalty card, 25% charged to a credit card.

Figure 3:
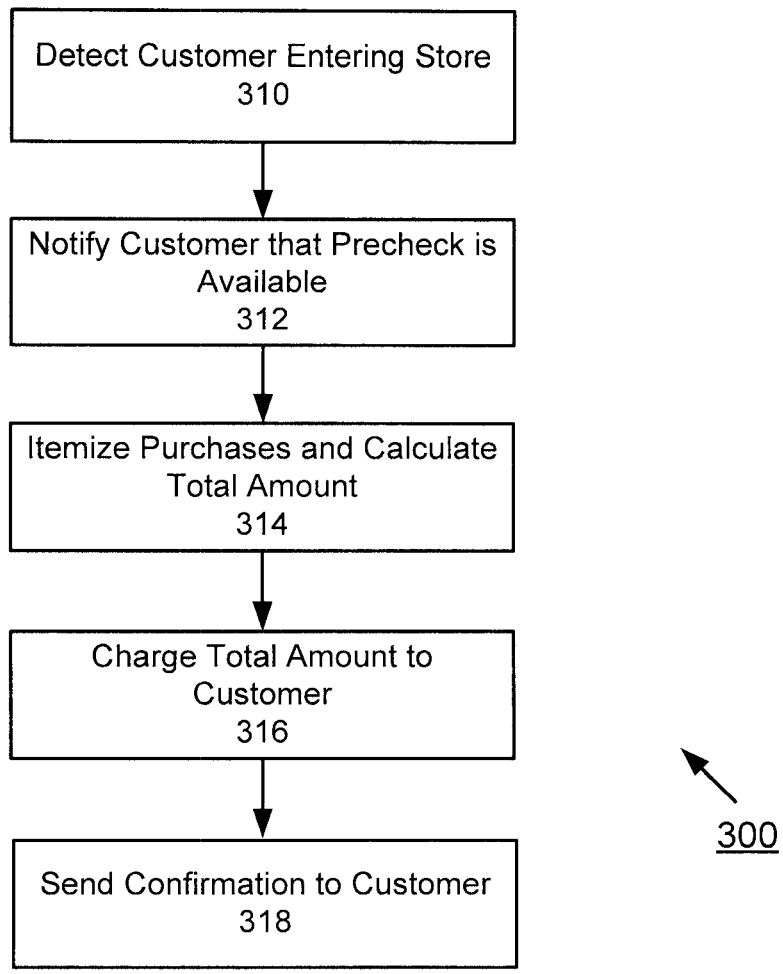
FIG. 3 is an exemplary diagram of a method for implementing a precheck feature for an in-store passive customer, according to an embodiment of the present invention.

FIG. 3 is an exemplary diagram of a method for implementing a precheck feature for an in-store passive customer, according to an embodiment of the present invention. At step 310, the customer may enter a merchant location. At step 312, an embodiment of the present invention may notify the customer that precheck feature is available. At step 314, an embodiment of the present invention may itemize purchases and a total amount. At step 316, the customer may be charged. At step 318, confirmation may be provided to the customer. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, the customer may enter a merchant location. The merchant location may be a store, kiosk, and/or other establishment. The customer may also access a website, engage in a phone conversation with a merchant, activate a merchant app on a mobile or other device.

At step 312, an embodiment of the present invention may notify the customer that a precheck feature is available. The notification may be on a mobile device associated with the customer. If the customer makes an online purchase, the notification may be on the website, a pop-up screen, and/or on an associated mobile or other device. If the customer is accessing a mobile app, the notification may appear as a text message, in-app message, etc. The customer may be notified in multiple ways. For example, if the customer has a digital card, the digital card may display a temporary message, change colors, an icon may appear or modify, etc.

At step 314, an embodiment of the present invention may itemize purchases and calculate a total amount. For example, as the customer shops around the merchant store, the customer may place items in a shopping card, basket, etc. The system may confirm the number of items in a customer's shopping cart and also confirm the amount charged for each item and/or the total amount for the purchase on the customers mobile device. The information may be displayed on a corresponding merchant app, bank app, third party service app, etc.

At step 316, the customer may be charged. The amount may be charged to a payment instrument associated with the customer. The payment instrument may be a credit card, debit card, loyalty card, etc. Also, the charge may be from one or more other funding sources. Other variations may be implemented.

At step 318, confirmation may be provided to the customer. A confirmation message may be provided to the customer, the confirmation may be in the form of a text message, in-app message, email, voice mail, etc.

Figure 4:
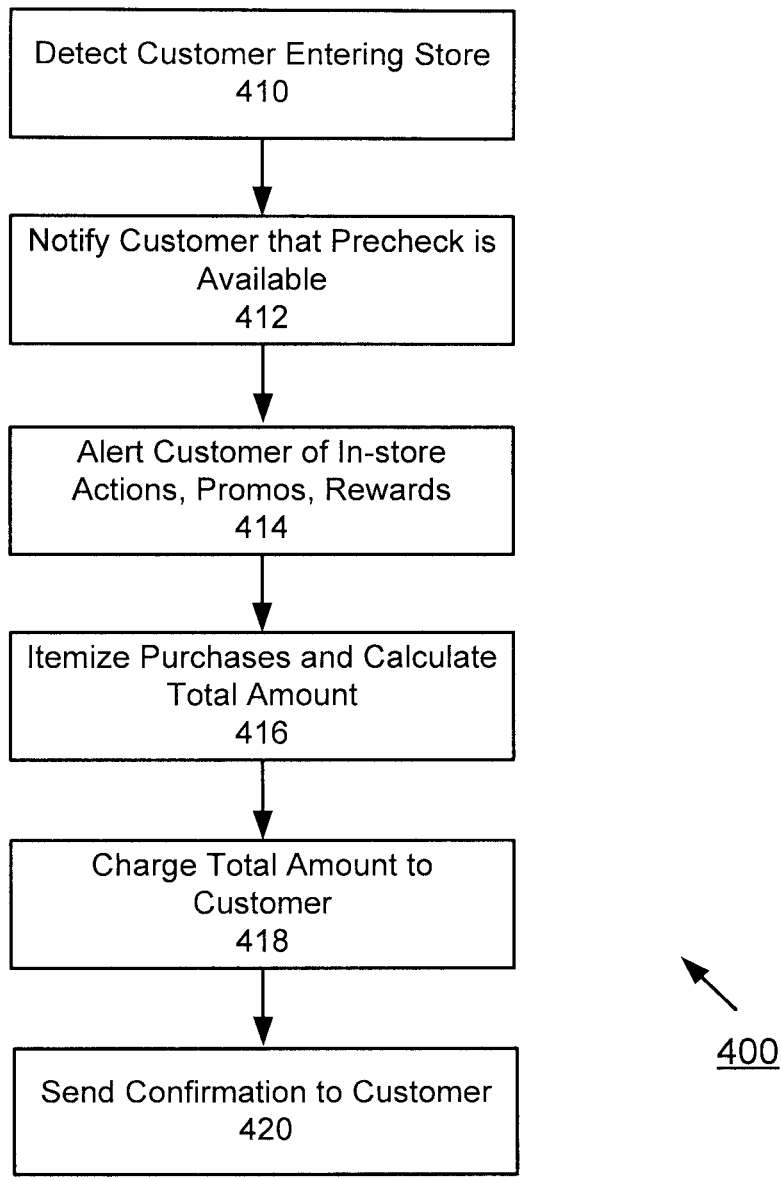
FIG. 4 is an exemplary diagram of a method for implementing a precheck feature for an in-store active customer, according to an embodiment of the present invention.

FIG. 4 is an exemplary diagram of a method for implementing a precheck feature for an in-store active customer, according to an embodiment of the present invention. At step 410, a customer may enter a merchant location. At step 412, an embodiment of the present invention may notify the customer that precheck feature is available. At step 414, customized suggestions may be provided to the customer. At step 416, an embodiment of the present invention may itemize purchases and total. At step 418, the customer may be charged. At step 420, confirmation may be provided to the customer. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 410, a customer may enter a merchant location. At step 412, an embodiment of the present invention may notify the customer that a precheck feature is available. An embodiment of the present invention provides an in-store experience where the customer receives customized information and may further interact with the system. This provides the customer with a unique and engaging shopping experience.

At step 414, customized suggestions may be provided to the customer. An embodiment of the present invention may provide in-store actions, promotions, rewards, suggested products, itemized carts, cart total, etc. For example, the customer may be notified of a discount, e.g., 10% off purchase today. An embodiment of the present invention may also provide a list of suggested items, with store locations, e.g., aisle locations. The items may be from a current store, and/or multiple locations. If multiple locations are involved, an embodiment of the present invention may offer a suggested route. In a single location, an in-store route (including aisle locations) may be provided as well. Additional information may be provided, including health information, calorie count, whether a purchase is an appropriate purchase for a new diet, etc.

At step 416, an embodiment of the present invention may itemize purchases and calculate a total amount. For example, a customer may view how much each item costs, including item count. If rewards, discounts and/or other benefits are available (or within reach), corresponding information may be provided. If a customer purchases two bottles of coconut water, an embodiment of the present invention may indicate that if the customer purchases one more, a 25% discount applies to three or more bottles of coconut water. Also, the customer's savings may be displayed.

At step 418, the customer may be charged. An embodiment of the present invention may inform the customer that a total amount will be charged as the customer leaves the merchant location.

While shopping with some merchants, a customer may request additional services or help. For example, some customers may need help loading or carrying groceries. As a customer exits a grocery store, an employee may be alerted to assist the customer. Other customers who shop in the city may need a taxi, cab or car service when leaving the store. An embodiment of the present invention may request a car service to pick up the customer. Other services may be offered to select customers, e.g., personal shopper, store clerk to provide assistance or answer questions.

At step 420, confirmation may be provided to the customer.

Figure 5:
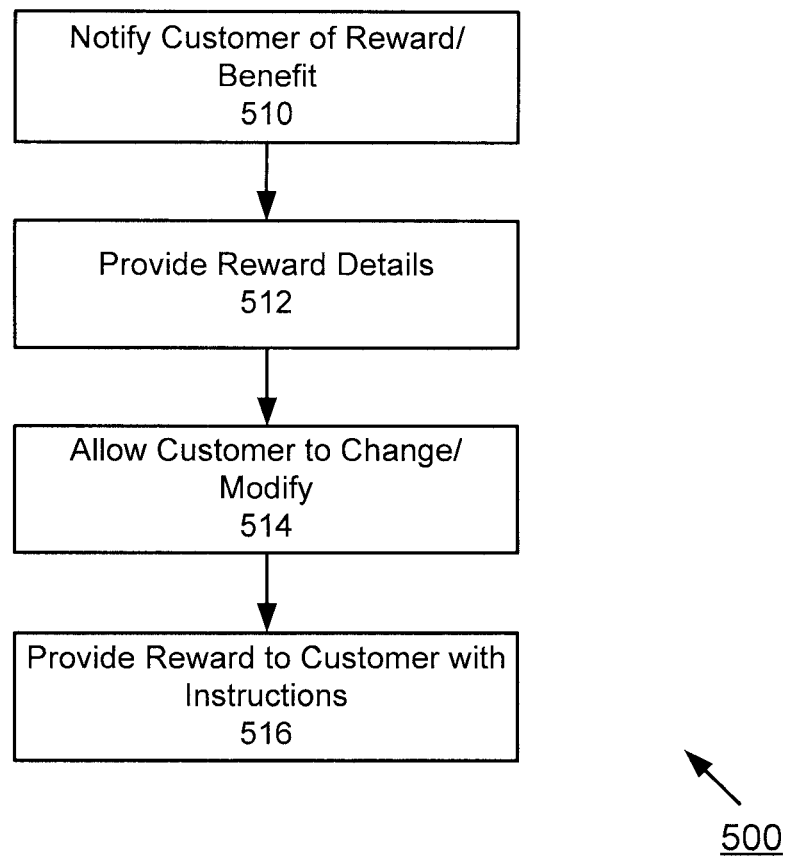
FIG. 5 is an exemplary diagram of a method for implementing a precheck feature with contextual rewards, according to an embodiment of the present invention.

FIG. 5 is an exemplary diagram of a method for implementing a precheck feature with contextual rewards, according to an embodiment of the present invention. At step 510, a customer may be notified of a reward or benefit. At step 512, an embodiment of the present invention may provide reward details. At step 514, the customer may review and/or modify the reward. At step 516, an embodiment of the present invention may provide the reward. The order illustrated in FIG. 5 is merely exemplary. While the process of FIG. 5 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 510, a customer may be notified of a reward or benefit. As the customer spends and visits a particular merchant or merchant type, the customer may receive customized benefits, rewards, and/or other incentives. The discount may be based on merchant factors, preferences, inventory, new products, etc. Also, rewards and benefits may be customized based on demographics, past behavior, past purchases, etc. An embodiment of the present invention may recognize that the customer is part of a family who travels to the beach almost all summer. This customer may receive discounts for sunscreen and kid's sun gear. An embodiment of the present invention may identify a customer's dining and/or shopping preferences and provide incentives accordingly. For example, a customer may be offered a perk in the form of a free donut, instead of free coffee drink, because this customer does not drink coffee.

At step 512, an embodiment of the present invention may provide reward details. For example, a reward or benefit description as well as contextual actions for redeeming may be provided. For some rewards, additional customer input may be required. Also, additional instructions or directions may be provided.

At step 514, the customer may review and/or modify the reward. The customer may modify the reward for further customization and preferences. The customer may also add additional items (for purchase) to the reward.

At step 516, an embodiment of the present invention may provide the reward. Also, the customer may be notified that the reward has been redeemed and may be given additional instructions and context.

Figure 7:
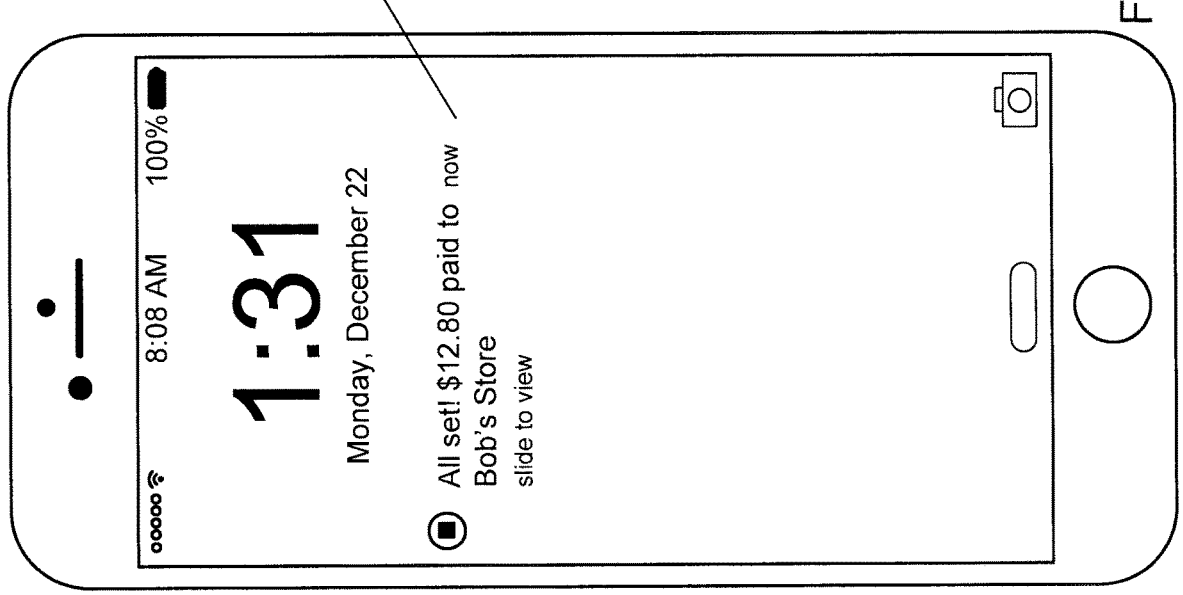
FIG. 7 is an exemplary screen shot illustrating a precheck feature, according to an embodiment of the present invention.
Figure 6:
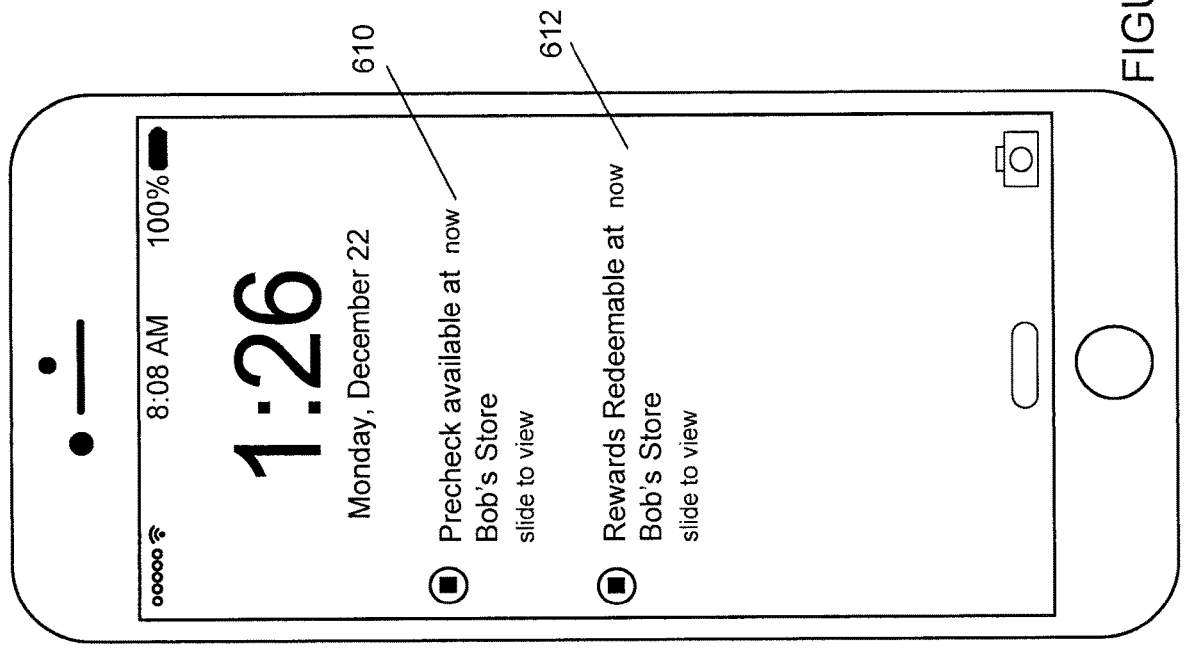
FIG. 6 is an exemplary screen shot illustrating a precheck feature, according to an embodiment of the present invention.

FIGS. 6-7 are exemplary screen shots illustrating a precheck feature, according to an embodiment of the present invention. As a customer enters a merchant store, the customer may be alerted that a precheck feature of an embodiment of the present invention is available, a shown by 610. The customer may opt to activate the feature. Also, the precheck feature may be automatically activated. The automatic activation may be applied for preapproved merchants. In this example, the customer may also redeem rewards at the merchant location. Other benefits, incentives and/or rewards may be offered, as shown by 612. When the customer has completed shopping, the customer may be automatically charged, as shown by 710 in FIG. 7.

Figure 8:
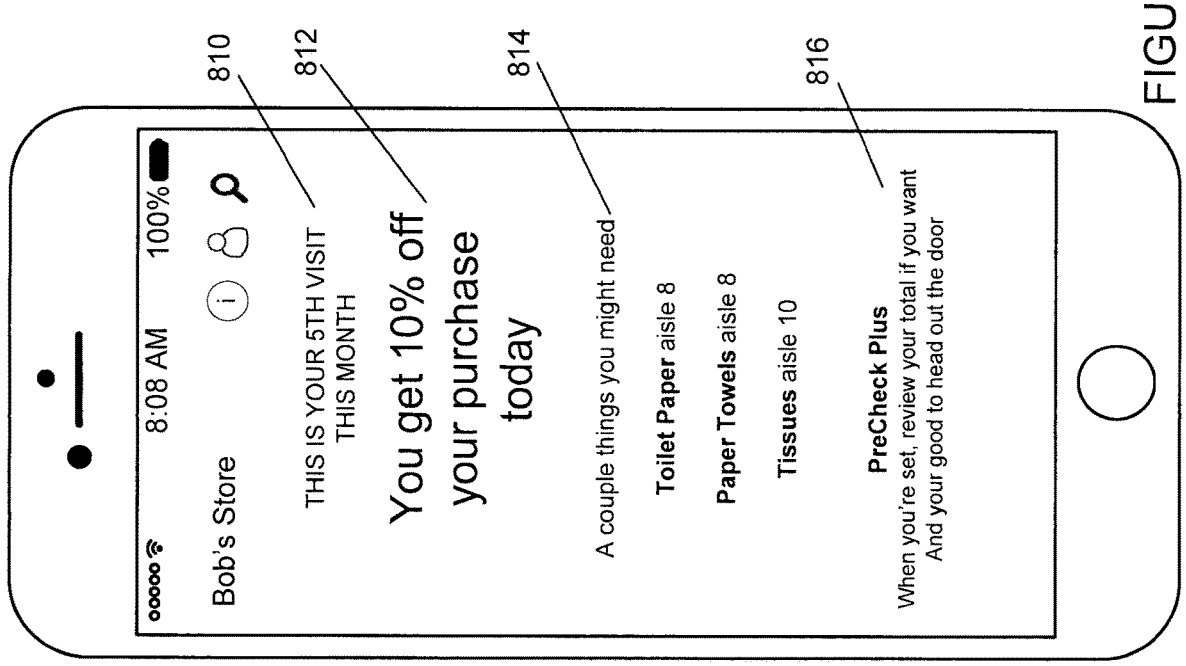
FIG. 8 is an exemplary screen shot illustrating a precheck feature, according to an embodiment of the present invention.

FIG. 8 is an exemplary screen shot illustrating a precheck feature, according to an embodiment of the present invention. FIG. 8 illustrates customer status and personalized incentives and suggestions. As shown in FIG. 8, customer status in terms of number of visits may be provided at 810. An embodiment of the present invention may actively engage the customer and provide timely, relevant and tailored information. For example, as shown in FIG. 8, the customer may be alerted of a discount for current purchases, at 812. An embodiment may provide customized suggestions at 814, which may be based on historical data (e.g., prior purchases), brand loyalty, sale items, customer preferences, customer profile data, etc. As shown in FIG. 8, a precheck feature is available that enables the customer to review the total, as shown by 816.

Figure 9:
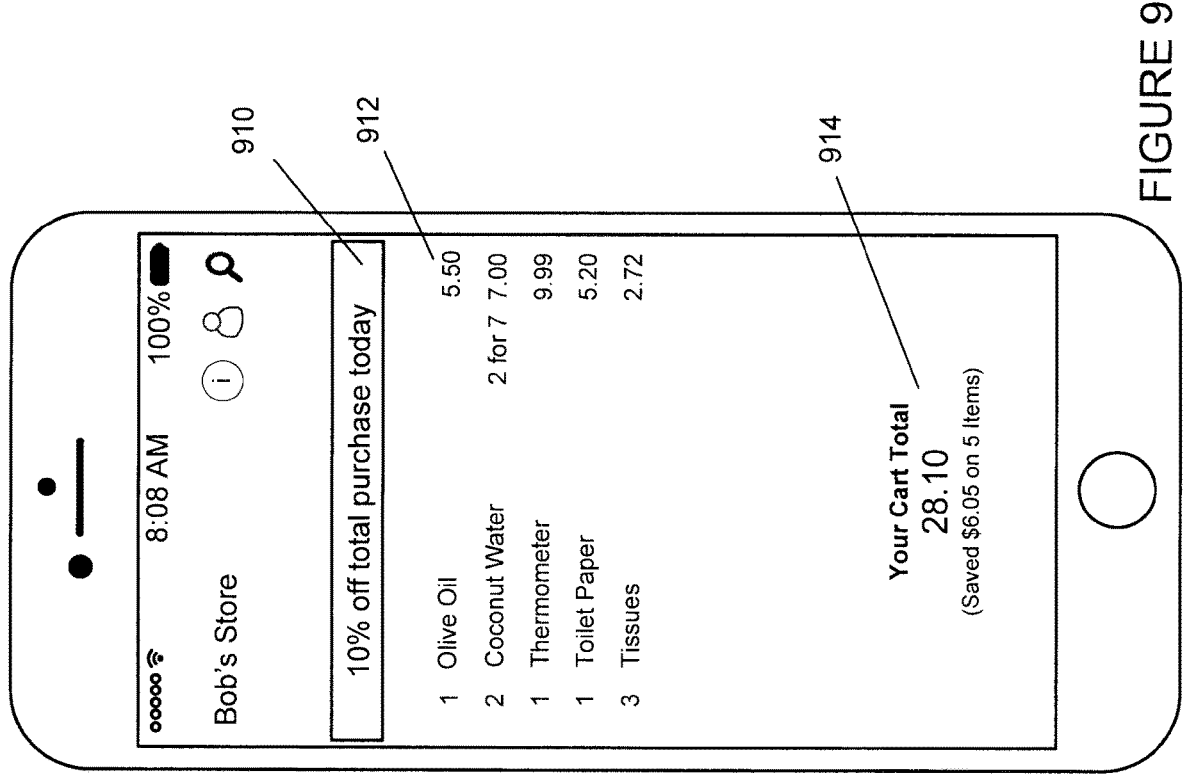
FIG. 9 is an exemplary screen shot illustrating a precheck feature, according to an embodiment of the present invention.

FIG. 9 is an exemplary screen shot illustrating a precheck feature, according to an embodiment of the present invention. A current reward may be provided at 910. A customer may view line item details of the products in the customer's shopping cart or bag, at 912. As shown here, each item and price may be displayed. Also, if a discount or sale is applied, such information may be graphically displayed (e.g., different color, sale icon next to the line item, etc.). Other discount and sales data may be provided. A cart total may be displayed at 914.

FIG. 10 is an exemplary screen shot illustrating a precheck feature, according to an embodiment of the present invention. A current reward may be shown at 1010. A customer's total transaction amount may be provided at 1012. The customer may be informed that the total amount will be charged as the customer leaves the merchant location, at 1014. Also, the customer may view how close the exit is by steps, and/or other graphics or metrics, as illustrated at 1016.

FIG. 11 is an exemplary screen shot illustrating a precheck feature, according to an embodiment of the present invention. As the customer departs the merchant location with items in hand, a confirmation message may be provided to the customer, as shown by 1110. In this example, the customer is informed that a total amount has been paid and charged, at 1114. The customer may also apply loyalty points, reward points, credit and/or other form of currency to the transaction. The order of payment may be automatically applied and/or scheduled by the customer. A personalized message concerning the customer's status may be shown at 1112.

Figure 12:
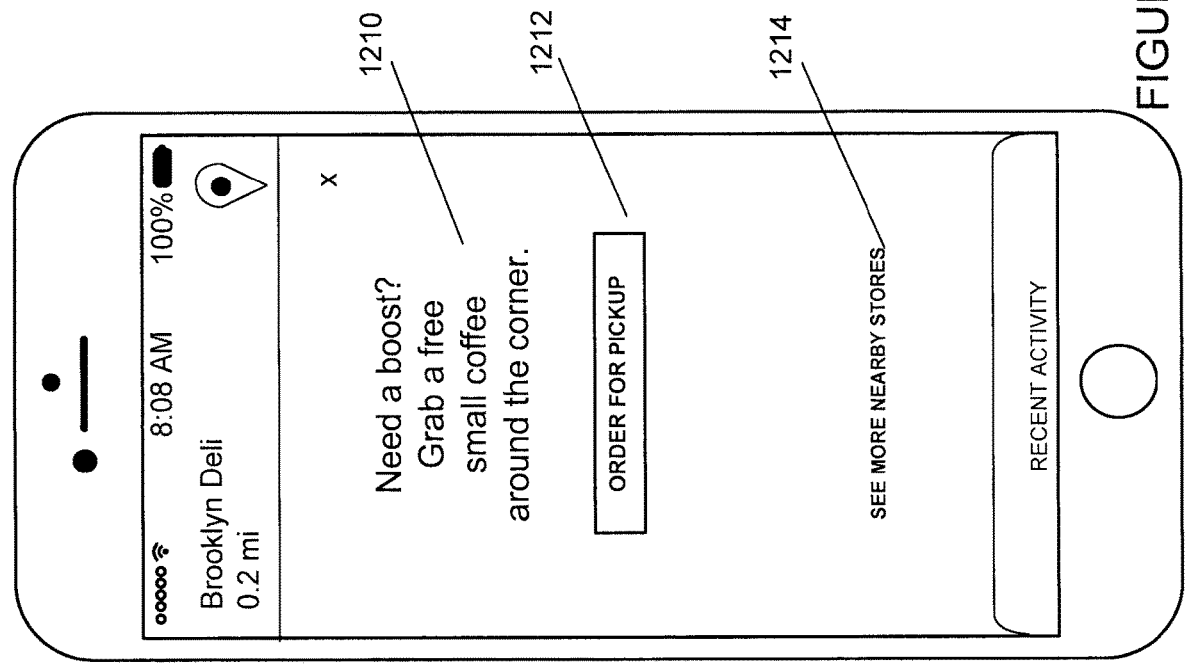
FIG. 12 is an exemplary screen shot illustrating a contextual reward feature, according to an embodiment of the present invention.

FIG. 12 is an exemplary screen shot illustrating a contextual reward feature, according to an embodiment of the present invention. Contextual rewards may be based on various factors, including customer spend activity, payment activity, social media activity, customer profile, merchant data, etc. As shown in FIG. 12, a customer may receive a customized reward for a coffee around the corner, at 1210. In this example, the customer may order the coffee for pickup, at 1212 and also view nearby store locations, at 1214.

Figure 13:
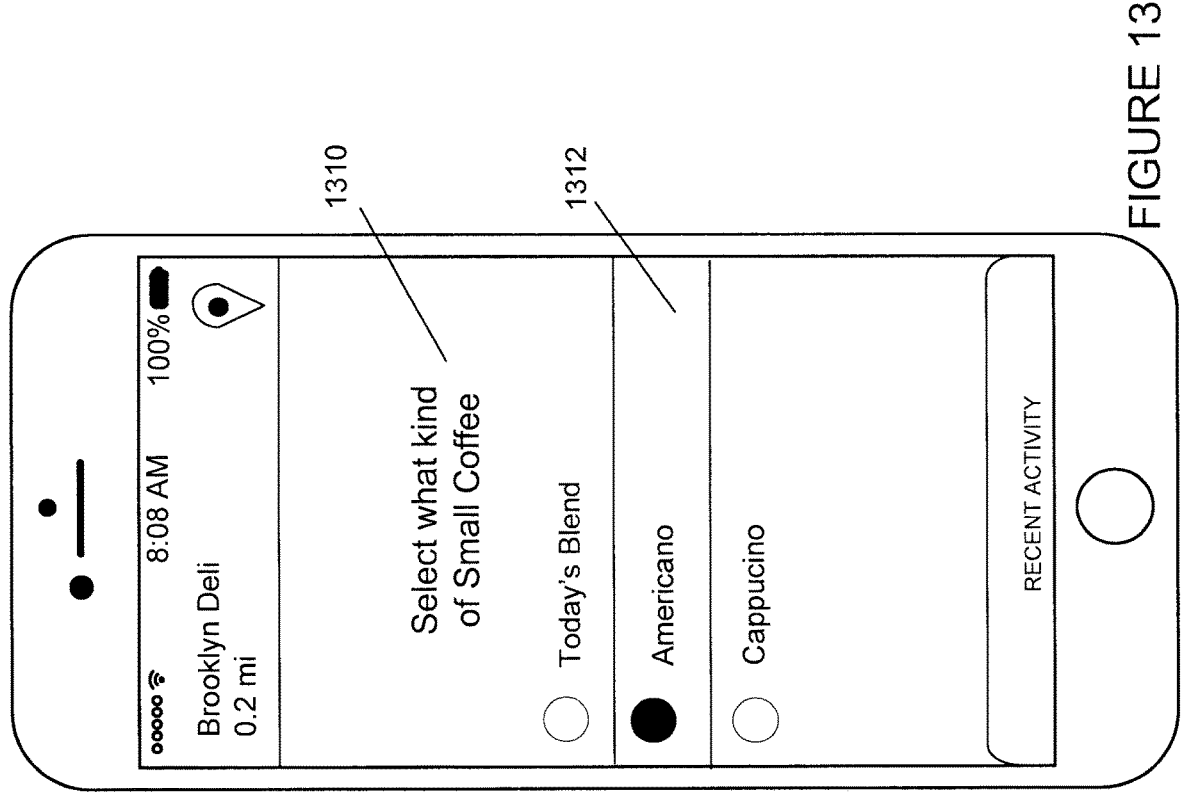
FIG. 13 is an exemplary screen shot illustrating a contextual reward feature, according to an embodiment of the present invention.

FIG. 13 is an exemplary screen shot illustrating a contextual reward feature, according to an embodiment of the present invention. By accepting the offered contextual reward, a customer may personalize the reward at 1310, 1312. In this coffee example, the customer may select the type of coffee, size of coffee, extra shot of expresso, soy milk, etc. The customer may also designate which coffee shop and a time frame (e.g., in 5 minutes, at 3:00 pm, etc.). The customer may even add a meal and/or additional drink (e.g., bottle of water, bagel, etc.). Additionally, the customer may indicate a preferred reward and particularize the drink reward (e.g., small black coffee) in advance. Also, the system of an embodiment of the present invention may automatically determine the customer's reward of choice based on spending activity and other information.

Figure 14:
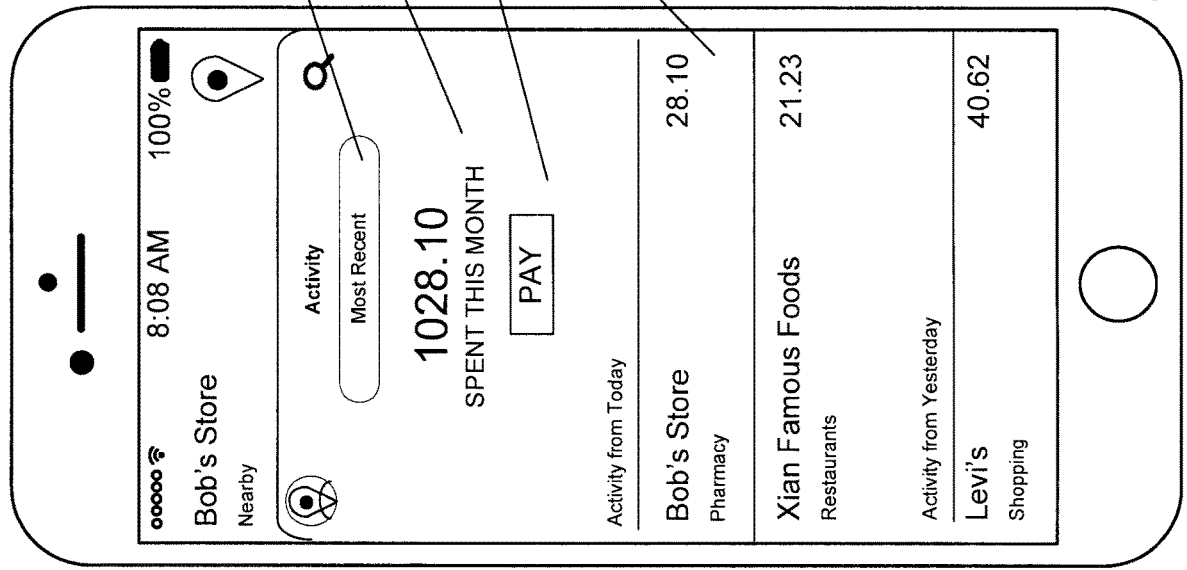
FIG. 14 is an exemplary screen shot illustrating a contextual reward feature, according to an embodiment of the present invention.

FIG. 14 is an exemplary screen shot illustrating a contextual reward feature, according to an embodiment of the present invention. As shown in FIG. 14, the customer may be informed that the reward is ready for redemption or pickup, at 1410. The customer may also view directions (which may include a map and route information), at 1412. The customer may call, text or otherwise contact the merchant providing the reward, at 1414.

Figure 15:
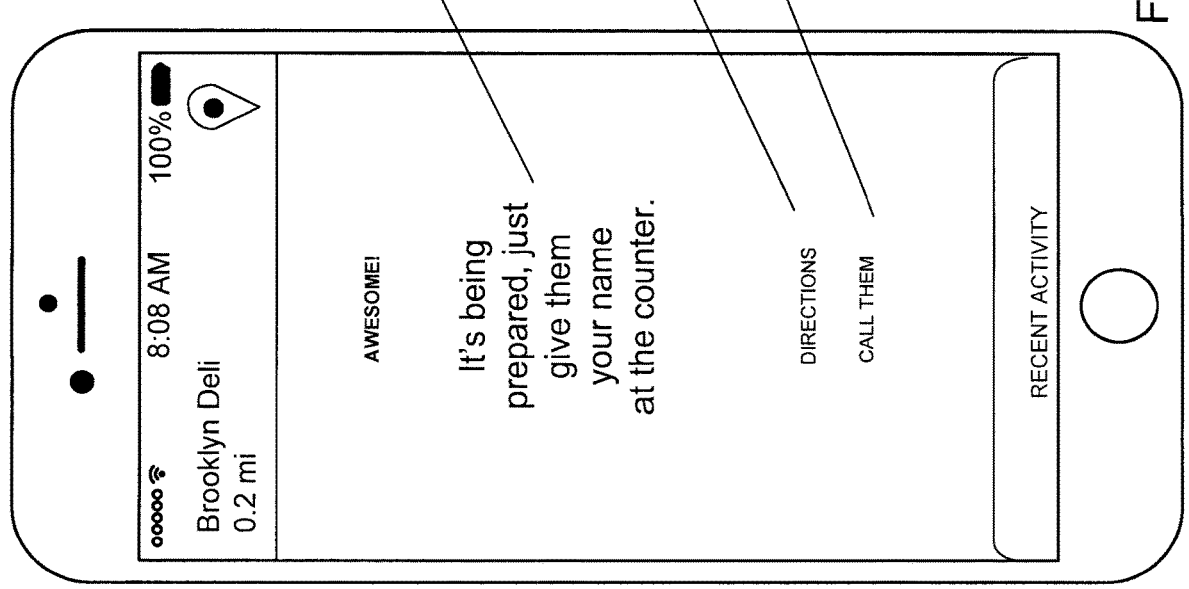
FIG. 15 is an exemplary screen shot illustrating a recent activity feature, according to an embodiment of the present invention.

FIG. 15 is an exemplary screen shot illustrating a recent activity feature, according to an embodiment of the present invention. As shown in FIG. 15, a customer may review spend activity, including total spending for a time period, e.g., day, week, month, quarter, year, etc., at 1510. The customer may also view recent activity, as shown by 1512, which may be based on merchant location, time of day, amount and/or other filters and factors. The customer may also make payments by selecting 1514. For example, by swiping to the left, the customer may pay at a transaction level. In this example, the customer may swipe left on the first line item to pay the $28.10 transaction from a funding source. The customer may also pay at a monthly transaction level as well as one or more line items at any time, as shown by 1516. According to another example, a customer may swipe right to pay with a credit card and swipe left to pay with a debit card. For some transactions, a customer may be given different payment options. For some merchants, products, services, brands, a customer may identify a particular payment method or instrument (e.g., grocery payments are made via a general credit card). Other variations may be applied.

Figure 16:
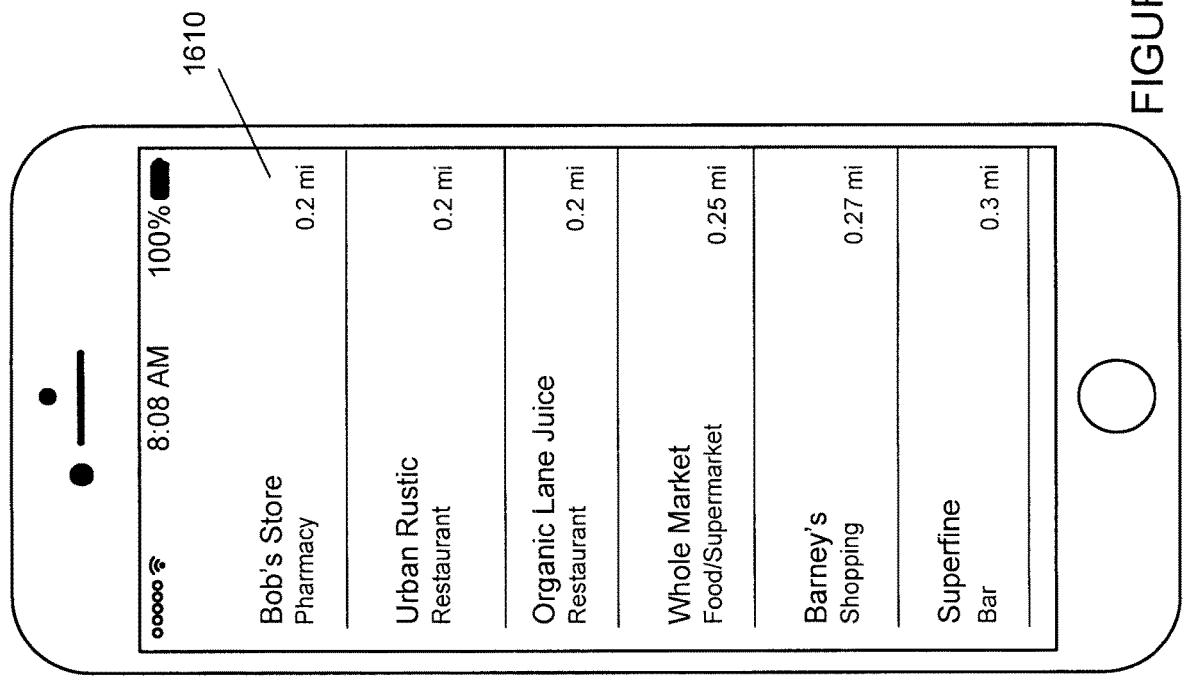
FIG. 16 is an exemplary screen shot illustrating nearby participating merchants, according to an embodiment of the present invention.

FIG. 16 is an exemplary screen shot illustrating nearby participating merchants, according to an embodiment of the present invention. An embodiment of the present invention provides a list of nearby merchants that offer a precheck function, as shown by 1610. A customer may perform searches, apply filters and perform other functions to identify and browse nearby participating merchants, etc. The customer may retrieve directions, view a map function as well as access rewards, coupons, promotions and also reserve or preorder products, services, make appointments, etc. The customer may also identify a shopping list for the merchant location. Further, the customer may pre-order the items on the customer's shopping list for pick up.

Figure 17:
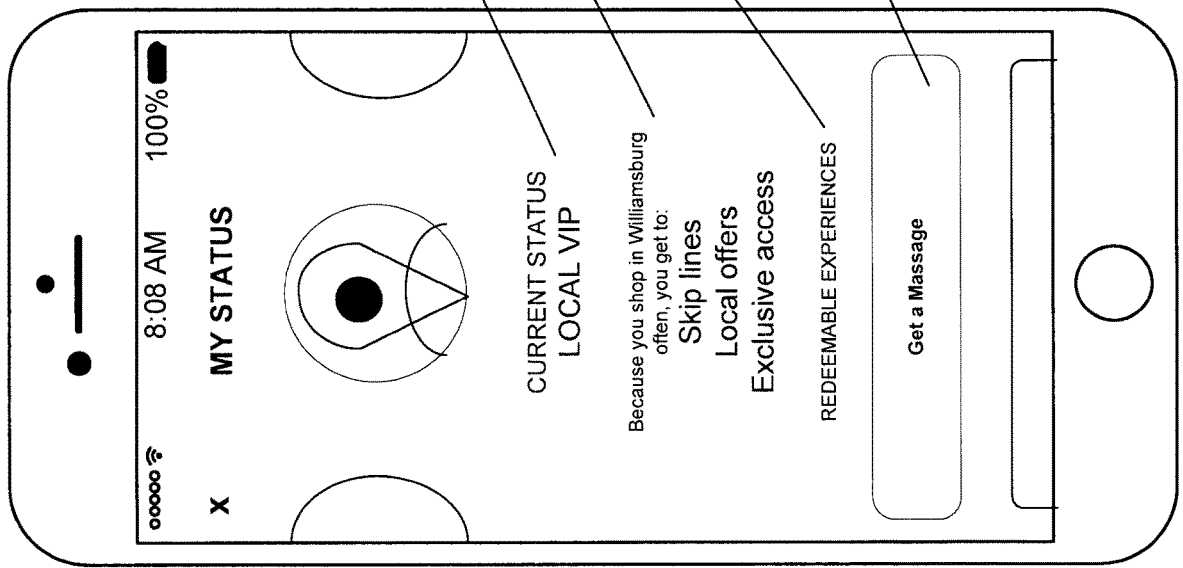
FIG. 17 is an exemplary screen shot illustrating a customer status feature, according to an embodiment of the present invention.

FIG. 17 is an exemplary screen shot illustrating a customer status feature, according to an embodiment of the present invention. The customer may view current status, attainable goals, redeemable rewards and/or other customized messages and offers. FIG. 17 provides a customer's current status, at 1710. As shown here, the customer has local VIP status. For this location, the customer receives perks and benefits, including the ability to skip lines, receive local offers, exclusive access, etc., as shown by 1712. Also, the customer may view redeemable experiences at 1714, which may include services such as massages, bike tours, beauty appointments, etc., as shown by 1716.

Although the foregoing description has focused primarily on a financial institution assembling relevant data sets, processing the data, and sending the relevant data at appropriate times to its customer, the system may be operated and maintained by other types of commercial entities who may configure the system to provide similar advantages to their customers. In additional, while the foregoing description has focused primarily on the customer spend, the principles of the invention can be applied to other vendors and entities where the operating entity can assemble and provide relevant, timely information to enhance the customer's experience.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers shown by FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications network, e.g., 110 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network, e.g., 110 in FIG. 1, may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 110 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 110, may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although examples of a mobile device 132, 134 and a personal computing device 136 are shown in FIG. 1, exemplary embodiments of the invention may utilize other types of communication devices whereby a user may interact with a network that transmits and delivers data and information used by the various systems and methods described herein. The mobile device and personal computing device may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The mobile device 132, 134 and personal computing device 136 may include various connections such as a cell phone connection, WiFi connection, Bluetooth connection, satellite network connection, and/or near field communication (NFC) connection, for example.

As described above, FIG. 1 includes a number of servers 122, 128 and user communication devices 132, 134, 136, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 132, 134 or personal computing device 136. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A mobile device that pays for items without having to physically interact with a cashier terminal, the mobile device comprising:

a memory that stores data associated with an account and a user;

a microprocessor, coupled to the memory, programmed to perform the following:

detect the mobile device entering a merchant location;

verify a user defined precheck setting wherein the precheck setting may be set based on one or more of retail store, geographic location, and time of day, and wherein the precheck feature authorizes an automatic charge for one or more goods from the merchant to the account stored in the memory;

automatically activate a precheck feature on the mobile device, consistent with the user defined precheck setting, upon the mobile device entering a merchant location;

identify one or more items intended for purchase based on an radio frequency identification (RFID) sensor on each of the one or more items intended for purchase, indicating that each of the one or more items has been placed into a users shopping cart;

calculate a total amount for the one or more items where the total amount is updated on an ongoing basis by adding a cost for an item to the total amount when the item is placed into the user's shopping cart and subtracting a cost for an item from the total amount when the item is removed from the users shopping cart;

compare the total amount to a user designated budget;

provide a warning if the total amount exceeds the user designated budget, wherein the warning comprises one or more of a text message, a vibration, and an audible noise;

display the comparison of the total amount to the user designated budget;

detect the mobile device departing the merchant location;

upon detection of the mobile device departing the merchant location, automatically initiate a charge for the total amount;

notify the user of the charge wherein the notification comprises one or more of a text message, a vibration, and an audible noise;

display a receipt based on the charge;

deduct the total amount of the charge from a funding source without the user making a payment interaction with a payment instrument or with any sales representatives; and provide at least one customized incentive to the user.

2. The mobile device of claim 1, wherein a merchant app is downloaded on a mobile device associated with the user.

3. The mobile device of claim 1, wherein the funding source is funded by the user's financial account at a financial institution.

4. The mobile device of claim 1, wherein the funding source is funded by a bank card associated with the user.

5. The mobile device of claim 1, wherein the microprocessor is further programmed to: provide personalized purchase suggestions to the user.

6. The mobile device of claim 1, wherein the microprocessor is further programmed to: analyze spending history and payment history for the user and generate customized suggestions based on the spending history and payment history.

7. The mobile device of claim 1, wherein the customized incentive is offered by a merchant at a different merchant location.

8. The mobile device of claim 1, wherein the customized incentive is based on customer spending data and payment data.

9. The mobile device of claim 8, wherein the customized incentive is further based on user social media data.

10. A non-transitory computer readable medium containing program instructions for in-store merchant payment without having to physically interact with a cashier terminal, wherein execution of the program instructions by one or more processors of a computer system causes the one or more processors to carry out the steps of:

detecting a mobile device entering a merchant location;

verifying a user defined precheck setting wherein the precheck setting may be set based on one or more of retail store, geographic location, and time of day, and wherein the precheck feature authorizes an automatic charge for one or more goods from the merchant to the account stored in a memory;

automatically activating a precheck feature on the mobile device, consistent with the user defined precheck setting, upon the mobile device entering a merchant location;

identifying one or more items intended for purchase based on an radio frequency identification (RFD) sensor on each of the one or more items intended for purchase, indicating that each of the one or more items has been placed into a user's shopping cart;

calculating a total amount for the one or more items where the total amount is updated on an ongoing basis by adding a cost for an item to the total amount when the item is placed into the user's shopping cart and subtracting a cost for an item from the total amount when the item is removed from the user's shopping cart;

comparing the total amount to a user designated budget;

providing a warning if the total amount exceeds the user designated budget, wherein the warning comprises one or more of a text message, a vibration, and an audible noise;

displaying the comparison of the total amount to the user designated budget;

detecting the mobile device departing the merchant location;

upon detection of the mobile device departing the merchant location, automatically initiating a charge for the total amount;

notifying the user of the charge wherein the notification comprises one or more of a text message, a vibration, and an audible noise;

displaying a receipt based on the charge;

deducting the total amount of the charge from a funding source without the user making a payment interaction with a payment instrument or with any sales representatives; and provide at least one customized incentive to the user.

11. The computer readable medium of claim 10, wherein a merchant app is downloaded on a mobile device associated with the user.

12. The computer readable medium of claim 10, wherein the funding source is funded by the user's financial account at a financial institution.

13. The computer readable medium of claim 10, wherein the funding source is funded by a bank card associated with the user.

14. The computer readable medium of claim 10, wherein the one or more processors are further programmed to: provide personalized purchase suggestions to the user.

15. The computer readable medium of claim 10, wherein the one or more processors is further programmed to: analyze spending history and payment history for the user and generate customized suggestions based on the spending history and payment history.

16. The computer readable medium of claim 10, wherein the customized incentive is offered by a merchant at a different merchant location.

17. The computer readable medium of claim 10, wherein the customized incentive is based on customer spending data and payment data.

18. The computer readable medium of claim 17, wherein the customized incentive is further based on user social media data.

* * * * *